S. L. FARIES.
Machine Gun.
X5656
Patented Oct. 10, 1829.
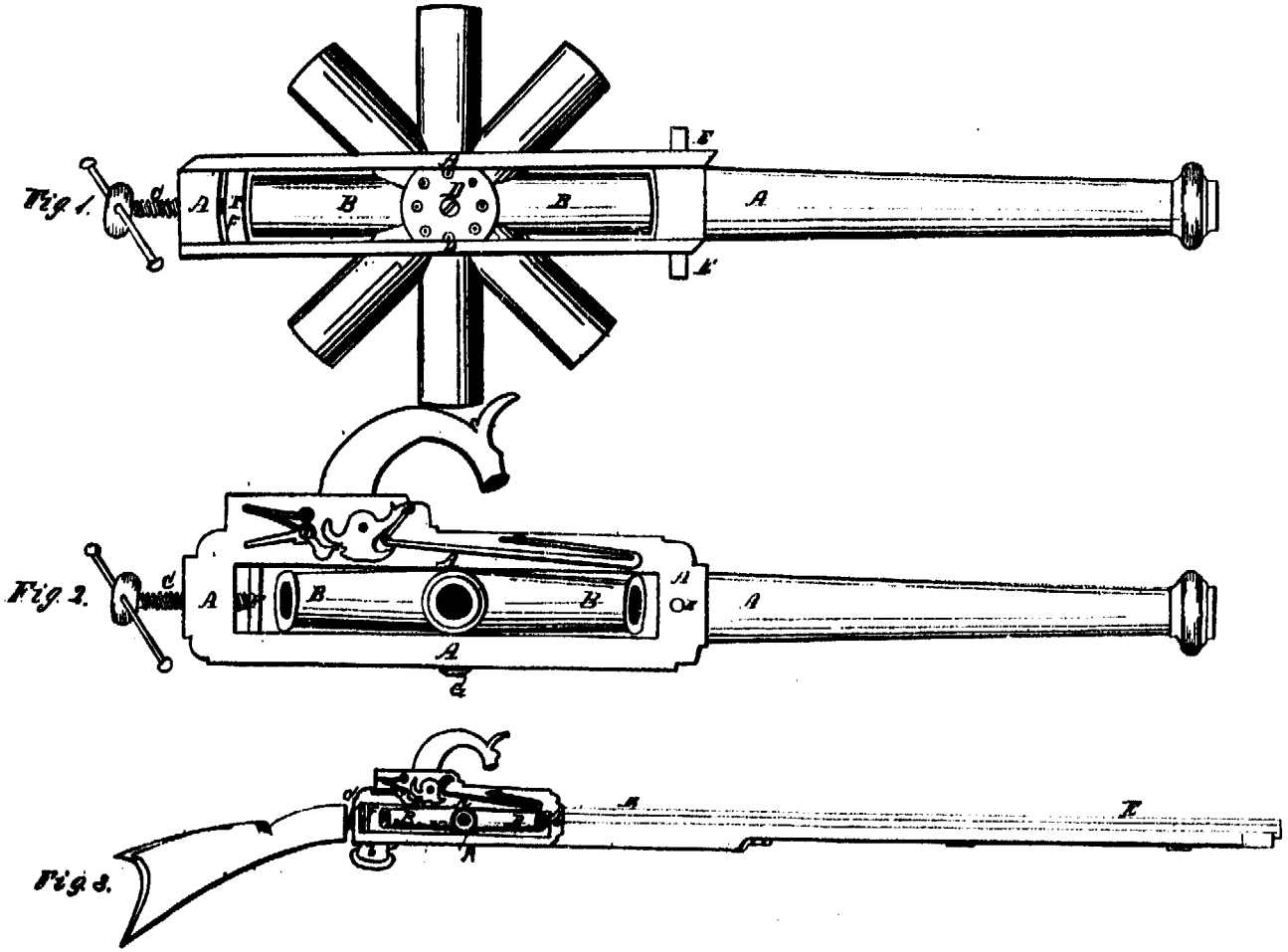
N. PETERS, PHOTO-LITHOGRAPHER, WASHINGTON, D. C.

X5656

UNITED STATES PATENT OFFICE.

SAMUEL L. FARRIES, OF MIDDLETOWN, OHIO.

IMPROVEMENT IN GUNS.

Specification forming part of Letters Patent dated October 10, 1829.

*To all whom it may concern:*

Be it known that I, SAMUEL L. FARRIES, of the town of Middletown, in the county of Butler and State of Ohio, have invented a new and useful Improvement in Making Guns to be named and called the "Eight-Barreled Percussion-Gun," to be applied as well to cannon as small-arms; and I do hereby declare that the following is a full and exact description of the construction and operation of the said improvement in guns as invented and improved by me—that is to say:

Figure I represents a view of a cannon, exclusive of the lock, and the parts marked A A A A being one connected piece and cast together, of any desirable size or caliber; the aperture or opening between the side bars, A A, to be such as to admit the part B B, composing the eight short barrels, to be placed in horizontally between the two lower bars and the two upper bars, the axles or gadgeons E E to be cast in connection with the long barrel, in such proportion as that the weight of the long barrel from E E may be about one-third of the weight of the whole piece in connection; the extreme butt A, being cast also in connection with the main piece, to be of sufficient substance to receive a large screw, C, to force up the follower F against the end of one of the short barrels, so that the fore end of the opposite barrel may be closely and firmly kept to the hinder end of the long barrel when fixed; and when a fire takes place, then give the screw one turn, and by means of a slider placed across the two under bars and the two upper bars the eight short barrels will recede a little, when one other of the barrels may be turned in and fire as before; the eight barrels B B to be cast in one piece by a pattern and each bored out directly toward the center, as deep as to *e e e e*, which are the touch-holes. The center D is a strong screw-head, and which passes directly downward to the slider aforesaid, (Marked G in Fig. II.)

Fig. II presents a side view of the cannon, to which is appended a lock, the cock to be placed on the inside of the side piece, and the mainspring tumbler, dog, and dog-spring are placed on the out or right-hand side of the side piece or bar, as aforesaid. The point or fore end of the cock is perforated, or has a suitable hole therein, and to strike over a percussion-cap.

Fig. III represents a rifle or small-arm, being a side view; E E, the long barrel, which may be of any suitable length and bore to suit the maker. The frame or open piece, (marked A A A,) in which the eight barrels revolve and to which the lock is appended, should be of brass, and cast with a sufficient opening at the fore end to receive the barrel E E, and to be fastened by screws, as at A, and at the opposite side, the breech of the rifle to be connected to the brass frame at *c* by means of a strong screw to pass through the butt of the brass frame at A, so that when screwed up to its place it will move forward the follower F against the end of one of the eight short barrels, and will firmly confine the whole until it be fired, when the great breech-screw will be turned half-round, and then turn in one other of the eight barrels until the whole be fired.

The lock is formed on the same plan and principle as is the lock for which I heretofore obtained a patent, a finished model of which is lodged in the Patent Office, with this difference only: In this the cock stands on the left of the lock, and the point or fore end of the cock is perforated so as to strike over a percussion-cap, as directed for the cannon lock in Fig. II.

The short barrels, for either great or small arms, should be but little more than sufficiently long to receive the cartridge or load. The ends of the short barrels, as well of the cannon as of the small-arms, should be dressed curved, comporting with a circle described from the center D, Fig. I, and the hinder end of the long barrel and the inside of the follower F to be curved dressed suitable thereto.

September 12, 1829.

SAMUEL L FARRIES.

Witnesses:

JAMES HEATON,

Z. BROWN.